United States Patent
Leppanen et al.

(10) Patent No.: US 7,532,626 B2
(45) Date of Patent: May 12, 2009

(54) DATA TRANSMISSION PROTOCOL

(75) Inventors: Sari Leppanen, Espoo (FI); Sinikka Sarkkinen, Espoo (FI); Ari Tourunen, Espoo (FI)

(73) Assignee: Nokia Corporation, Espoo (FI)

( * ) Notice: Subject to any disclaimer, the term of this patent is extended or adjusted under 35 U.S.C. 154(b) by 626 days.

(21) Appl. No.: 10/344,930

(22) PCT Filed: Aug. 17, 2001

(86) PCT No.: PCT/IB01/01757

§ 371 (c)(1),
(2), (4) Date: Jul. 28, 2003

(87) PCT Pub. No.: WO02/15510

PCT Pub. Date: Feb. 21, 2002

(65) Prior Publication Data

US 2004/0009771 A1 Jan. 15, 2004

(30) Foreign Application Priority Data

Aug. 18, 2000 (GB) ................................. 0020442.0

(51) Int. Cl.
*H04L 12/56* (2006.01)
(52) U.S. Cl. ...................................... 370/394; 370/477
(58) Field of Classification Search .................. 370/216, 370/235, 236, 349, 350, 389, 394, 395.1, 370/469, 473–479, 913, 229–231; 375/295, 375/316; 455/403, 412.1, 412.2
See application file for complete search history.

(56) References Cited

U.S. PATENT DOCUMENTS 6,289,016 B1 * 9/2001 Subbiah et al. .......... 370/395.1

(Continued)

FOREIGN PATENT DOCUMENTS

EP 0 909 063 A 4/1999

(Continued)

OTHER PUBLICATIONS

"Universal Mobile Telecommunications System (UMTS); Radio Link Control (RLC) Protocol Specification (3GPP TS 25.322 version 4.3.0 Release 4)", ETSI TS 125 322 V4.3.0, Dec. 2001, XP002902277.

(Continued)

*Primary Examiner*—Ricky Ngo
*Assistant Examiner*—Pao Sinkantarakorn
(74) *Attorney, Agent, or Firm*—Squire, Sanders & Dempsey, LLP

(57) ABSTRACT

A method of transmitting data from a transmitter towards a receiver can include forming a plurality of ordered data units each comprising a part of a data message. The method can also include transmitting at least some of the data units in order. The method can further include identifying a discard status in response of the data message. When a subset of the data units including the final one of the data units and at least one other of the data units has not been transmitted, the method can include indicating that the data message is to be discarded, specifying the identity of the final one of the data units, and transmitting only the final one of the data units from the subset.

30 Claims, 3 Drawing Sheets

U.S. PATENT DOCUMENTS

| | | |
|---|---|---|
| 6,512,747 B1 | 1/2003 | Umeuchi et al. |
| 6,621,796 B1 * | 9/2003 | Miklos .................. 370/236 |
| 7,106,742 B1 * | 9/2006 | Frisch et al. ............ 370/394 |
| 7,236,494 B2 * | 6/2007 | Mallory .................. 370/394 |

FOREIGN PATENT DOCUMENTS

| EP | 1 024 623 A | 8/2000 |
|---|---|---|
| JP | 11-341014 | 12/1999 |

OTHER PUBLICATIONS

"Universal Mobile Telecommunications System (UMTS) RLC Protocol Specification (3G TS 25.322 version 3.3.0. Release 1999)", ETSI TS 125 322 V3.3.0, Jun. 2000, XP002902276, pp. 1-125.

"TSG-RAN Working Group 2 (Radio layer 2 and Radio layer 3)", TSGR2//4(99) 407, May 25-28, 1999, WP002902278, pp. 1-2.

* cited by examiner

DATA TRANSMISSION PROTOCOL

This invention relates to a protocol for data transmission, for example for transmission of data units over a radio link. The protocol is especially suitable for addressing issues surrounding deletion of status protocol data units in third-generation (e.g. 3GPP or the like) radio telephone systems.

In the arrangement currently proposed for third-generation radio telephone systems, for example the RLC (radio link control) Protocol Specification (Release 1999) data can be carried between a transmitter and a receiver in the form of protocol data units (PDUs). One form of PDU is the status PDU (SDU). The SDU can carry information on the status of the link, for example details of which PDUs have been received or which are detected as missing. Pieces making up an SDU may be carried in a number of AMD (RLC) PDUs.

SDUs may be transmitted by the network over a radio interface to an item of user equipment (UE) such as a mobile phone, or by a UE over a radio interface to the network.

A maximum permitted number of retransmissions (Max-DAT) may be specified, as may a maximum permitted period of time for transmission (Timer_Discard). If an SDU has not been successfully conveyed from the transmitter to the receiver within MaxDAT retransmissions or within Timer_Discard period of time it may be discarded.

The discarding of an SDU is performed by means of the "move receiving window super field" (MRW SUFI) command sent from the data transmitter to the data receiver. The MWR SUFI command is send in STATUS PDU. The MRW SUFI command includes the following fields:

LENGTH. Specifies the number of SN_MRW fields in the MRW SUFI.

$SN\_MRW_{1-i}$. Provides a number i (equal to LENGTH-1) of fields each indicating the end of a discarded SDU. $SN\_MRW_i$ is the sequence number (SN) of the PDU that contains the LI (length indicator) of the ith discarded SDU. The LI field is used to indicate the end point of an SDU in an AMD PDU.

$SN\_MRW_{LENGTH}$. Requests the receiver to discard all PDUs with sequence number less than $SN\_MRW_{LENGTH}$ and to move its receiving window accordingly. In addition, the receiver is to discard the first $N_{LENGTH}$ LIs and the corresponding data bytes in the PDU with sequence number $SN\_MRW_{LENGTH}$.

$N_{LENGTH}$. Assists in indicating the end of the last discarded SDU as described above. $N_{LENGTH}$ indicates which LI in the PU with sequence number $SN\_MRW_{LENGTH}$ corresponds to the last discarded SDU. $N_{LENGTH}=0$ indicates that the last SDU ended in the PU with sequence number $SN\_MRW_{LENGTH}-1$ and that the first data byte in the PU with sequence number $SN\_MRW_{LENGTH}$ is the first data byte to be reassembled next According to the RLC Protocol Specification (Release 1999), although an SDU may be discarded, all AMD PDUs carrying pieces of that SDU are still sent over the radio interface. This means that valuable link resources are devoted to carrying data that has already been decided to be discarded. The worst case is when the size of the SDU to be discarded is considerably large and the SDU discard procedure is executed in an early phase of transmission of the SDU. This could, for example, happen if:

a. one of the first AMD PDUs for that SDU is lost; or b. if the SDU transmission timer expires when only few AMD PDUs have been transmitted, for instance as a result of a long delay in the radio interface.

In that situation the remainder of the AMD PDUs making up the already discarded SDU will still be transmitted, but merely waste radio resources because the transmitted data will never serve the user. In addition, this unnecessary data overhead may considerably slows down the rate of transmission of useful data and hence degrades the quality of service.

When the triggering of the SDU discard procedure is based on the timer set for the SDU transmission time (using the value Timer_Discard), the probability of the extra overhead and the consequent delays for the subsequent SDU transmissions causing considerable losses of user data and malfunction of the later data transmission procedure is particularly high.

Once the discard of an SDU has been performed it would be desirable to minimise or at least reduce the link resources subsequently devoted to that SDU. This could free up radio resources and increase the transmission rate of useful data.

According to the present invention from one aspect there is provided a method of transmitting data from a transmitter towards a receiver, comprising the steps of: forming a plurality of ordered data units each comprising a part of a data message; transmitting at least some of the data units in order; identifying a discard status in respect of the data message; and if a subset of the data units including the final one of the data units and at least one other of the data units has not been transmitted: indicating (for instance by means of a command) that the data message is to be discarded; and transmitting only the final one of the data units from the said subset, including an indication of the ending of the data message.

According to the present invention from another aspect there is provided a transmitter for communicating data to a receiver, the transmitted comprising a data transmission control unit operable to perform the steps of: forming a plurality of ordered data units each comprising a part of a data message; causing the transmission of at least some of the data units in order; identifying a discard status in respect of the data message; and if a subset of the data units including the final one of the data units and at least one other of the data units has not been transmitted: causing the transmission (for instance by means of a command) of an indication that the data message is to be discarded; and causing the transmission of only the final one of the data units from the said subset, including an indication of the ending of the data message.

Preferably, on identifying a discard status in respect of the data message; and if a subset of the data units including the final one of the data units and at least one other of the data units has not been transmitted the data units of the subset other than the final one of the data units are not transmitted from the transmitter towards the receiver.

Suitably, the method comprises the step of allotting consecutive sequence numbers to each of the data units in order. Preferably the method comprises the step of, before transmitting the final one of the data units reallotting a sequence number to that data unit. Preferably, the sequence number reallotted to the final one of the data units is the sequence number one greater than the sequence number of the last data unit transmitted. Alternatively, the sequence number reallotted to the final one of the data units may be a sequence number greater (most preferably two greater) than the sequence number of the last data unit transmitted. The method may comprise the steps of: allotting sequence numbers to further data units to be transmitted after the said data units comprising part of the data massage; and before transmitting those further data units realloting consecutive sequence numbers following that reallotted to the final one of the data units to the further data units.

The command indicating that the data message is to be discarded may be transmitted before or after the final one of the data units, subject to other demands of the protocol.

The data units are suitably protocol data units, preferably radio link control protocol data units.

The data message may be a status protocol data unit.

Preferably the method comprises specifying the identity of the final one of the data units.

The transmitter and/or the receiver are preferably operable according to the third-generation protocol specification or, suitably, a derivative thereof.

One of the transmitter and the receiver may be a mobile station. The other of the transmitter and the receiver may be a network unit.

Preferably the final one of the data units in order includes data specifying the length of the data message.

The present invention will now be described by way of example with reference to the accompanying drawings, in which.

Like parts are indicated by like reference numerals in FIGS. 3 to 6.

Figure 1:
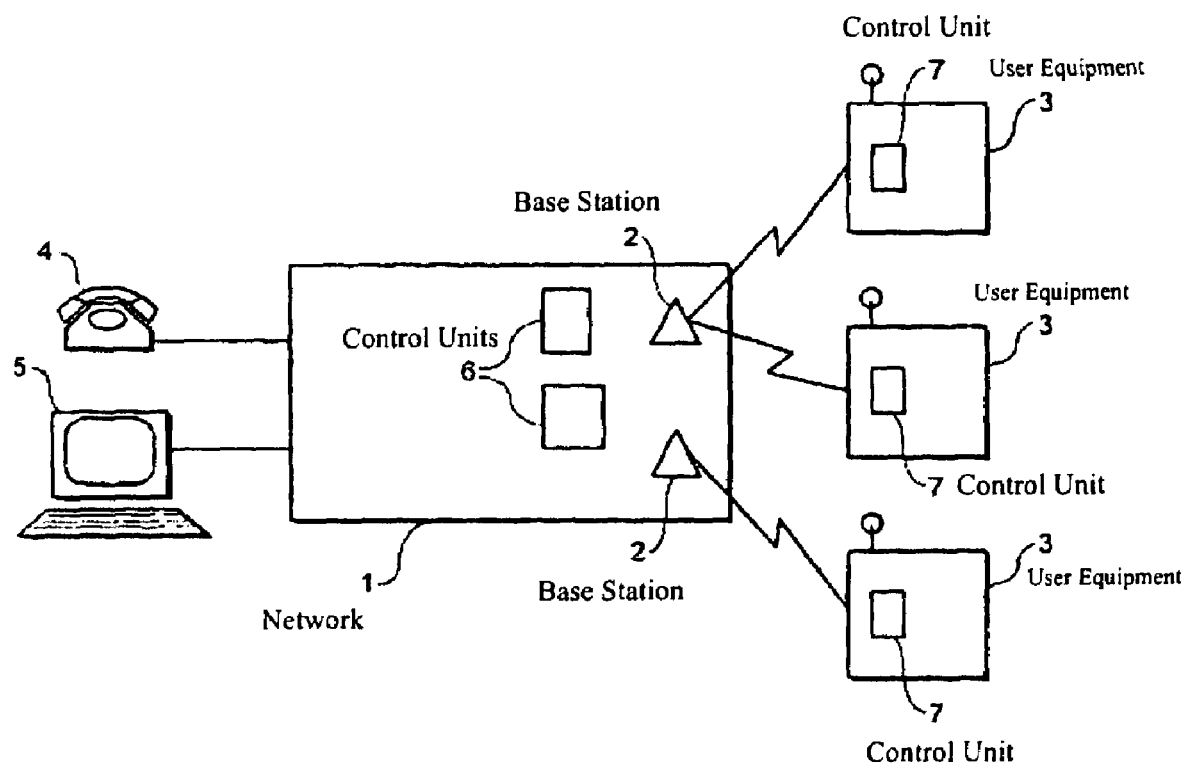
FIG. 1 is a schematic diagram of a radio telecommunications system.

FIG. 1 shows a radio telecommunications system. The system comprises a radio telecommunications network 1 including a plurality of base station transmission/reception units 2 which are capable of communicating by radio with user equipment 3. The user equipment could, for instance, be mobile stations such as mobile phones. By means of the network the UEs can communicate with each other or with other equipment such as land-line phone 4 or internet terminal 5 interconnected to the network 1. The network includes network data transmission/reception control units 6 which control the transmission and reception of data to an from the UEs according to a predetermined protocol. Correspondingly, the UEs include UE data transmission/reception control units 7 which control the transmission and reception of data to and from the network according to the predetermined protocol.

The protocol used for the transmission of data between the UEs and the network is suitably based on the RLC protocol, for example according to the RLC Protocol Specification (Release 1999) or the like. However, as described below, the present protocol includes provision for improved handling of discarded SDUs.

Procedures will now be described for the handling of discarded SDUs. These procedures are especially suitable for operation in a system such as that shown in FIG. 1, particularly for transmission of data between the network and the UEs (in either direction). However, the procedures may be implemented in other locations in the system of FIG. 1 and in other data transmission systems, for example over fixed rather than radio links or over other wireless links such as infra-red links.

Figure 2:
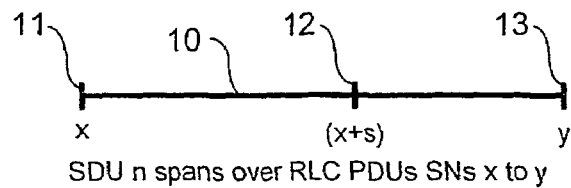
FIG. 2 shows an illustrative structure of an SDU as carried by a plurality of PDUs.

An SDU may be carried by a plurality of PDUs, with parts of the SDU being included in each of those PDUs. This situation is illustrated in FIG. 2. Each PDU has a sequence number. FIG. 2 illustrates a series of RLC PDUs having sequence numbers from x to y. Each of those PDUs carries part of a certain SDU. One of the PDUs carrying part of the SDU may be specified by the sequence number (x+s), where s is an offset from x in the range from 0 to (y−x). In this illustration x and y are not consecutive numbers.

The series of PDUs is illustrated in FIG. 2 by line 10. PDU x is indicated at 11, PDU y at 12 and an arbitrary PDU (x+s) at 13.

During operation of the telecommunications system a decision may be taken to discard an SDU, for example on one of the grounds set out above: the exceeding of a predetermined number of retransmissions or the exceeding of a predetermined time period for transmission. When the decision is taken to discard the SDU an SDU discard procedure is triggered.

After the SDU discard procedure is triggered the MRW SUFI command (see above) is sent to the receiver, with the next AMD PDU to be sent to the receiver being the one pointed to in the MRW SUFI command by its field $SN\_MRW_{LENGTH}$. This will be either the AMD PDU carrying the LI field of the discarded SDU or, in the case where the rest of the AMD PDU carrying the LI field of the discarded SDU is padding, the AMD PDU immediately following it. No further data transmission actions, including sending, resending or triggering the SDU discard procedure, are executed for those AMD PDUs preceding that defined below and pointed to by the $SN\_MRW_{LENGTH}$ field of the MRW SUFI command. For those RLC PDUs, whose RLC PDU number is < $MRW_{LENGTH}$ nothing is done. For those whose sequence number is >=$MRW_{LENGTH}$, they can be resent, if the transceiver so requests. However, those AMD PDUs are not be removed from the transmitter's buffer of data to be transmitted until that MRW SUFI command has been acknowledged by the receiver (suitably by means of the MRW_ACK SUFI command) and the lower edge of the window of acceptable acknowledgements is updated.

The sending of the MRW SUFI command and the corresponding specifying to the receiver AMD PDU can be done in four alternative ways, illustrated by FIGS. 3 to 6 respectively. In each of FIGS. 3 to 6, reference 20 denotes the transmitting unit, reference 21 denotes the receiving unit, reference 22 denotes the command to discard an SDU and reference 23 denotes generally data traffic from the transmitter to the receiver. The data traffic and the SDU discard command are shown in chronological order, starting from the top of each figure.

In each embodiment it is assumed that the SDU is carried by a plurality of PDUs as illustrated in FIG. 2 and that PDUs with sequence numbers x to (x+s) are sent from the transmitter to the receiver as shown at 24 before the discard command 22 is received.

Figure 3:
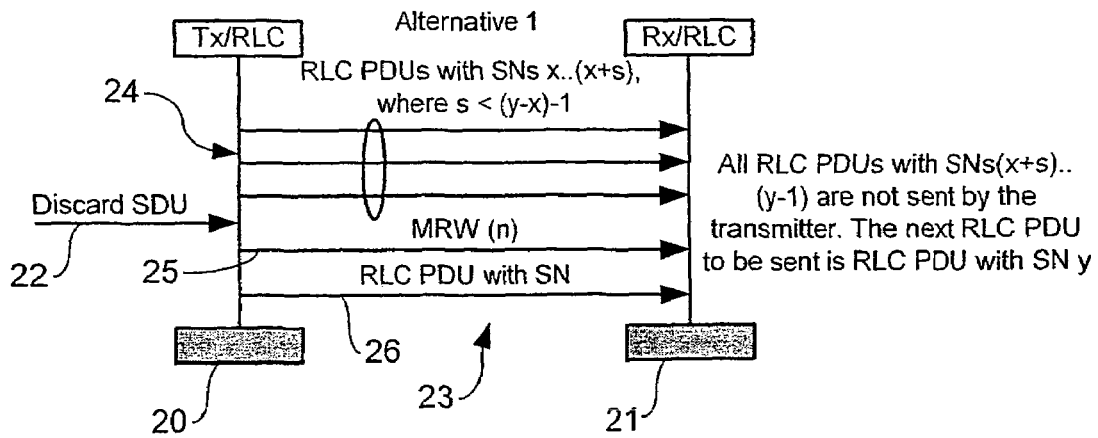
FIGS. 3 to 6 show alternative signaling arrangements for the transmission of SDUs.

The first method is illustrated in FIG. 3.

In the first method, first the MRW SUFI command (25) is sent from the transmitter to the receiver. After that the AMD PDU (26) carrying the LI field indicating the end of the discarded SDU is sent using the SN currently allotted to it, i.e. the PDU whose sequence number is y. This does not affect the transmission of consequential AMD. PDUs, which continues as usual (in-sequence, also noting the previous sendings, resendings and acknowledgements) from this point on. However, any PDUs in the range from (x+s) to y which would otherwise be sent need not now be transmitted. Once the MRW SUFI command has been acknowledged those PDUs can be deleted from the transmitting unit's buffer. The AMD PDU 26 is preferably sent immediately after the MRW SUFI command 25.

Figure 4:
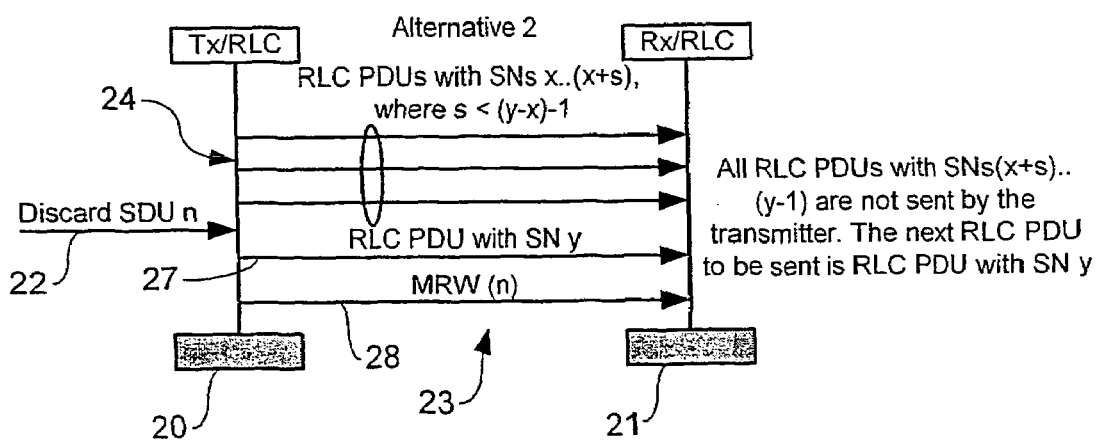

The second method is illustrated in FIG. 4.

In the second method, first the AMD PDU (27) carrying the LI field indicating the end of the discarded SDU is sent using the SN currently allotted to it. After that the MRW SUFI command (28) is sent. This does not affect the transmission of consequential AMD PDUs, which continues as usual (in-sequence, also noting the previous sendings, resendings and acknowledgements) from this point on. The MRW SUFI command 28 is preferably sent immediately after the AMD PDU 27. Again, any PDUs in the range from (x+s) to y which would otherwise be sent need not now be transmitted. Once the MRW SUFI command has been acknowledged those PDUs can be deleted from the transmitting unit's buffer.

In methods 1 and 2 there is a break in the sequence numbers of the PDUs that are transmitted. Some sequence numbers are allotted to PDUs that are not transmitted. Thus the sequence of sequence numbers as received by the receiver is not consecutive. It is conceivable that there may be a desire to avoid this situation. This is addressed by methods 3 and 4.

Figure 5:
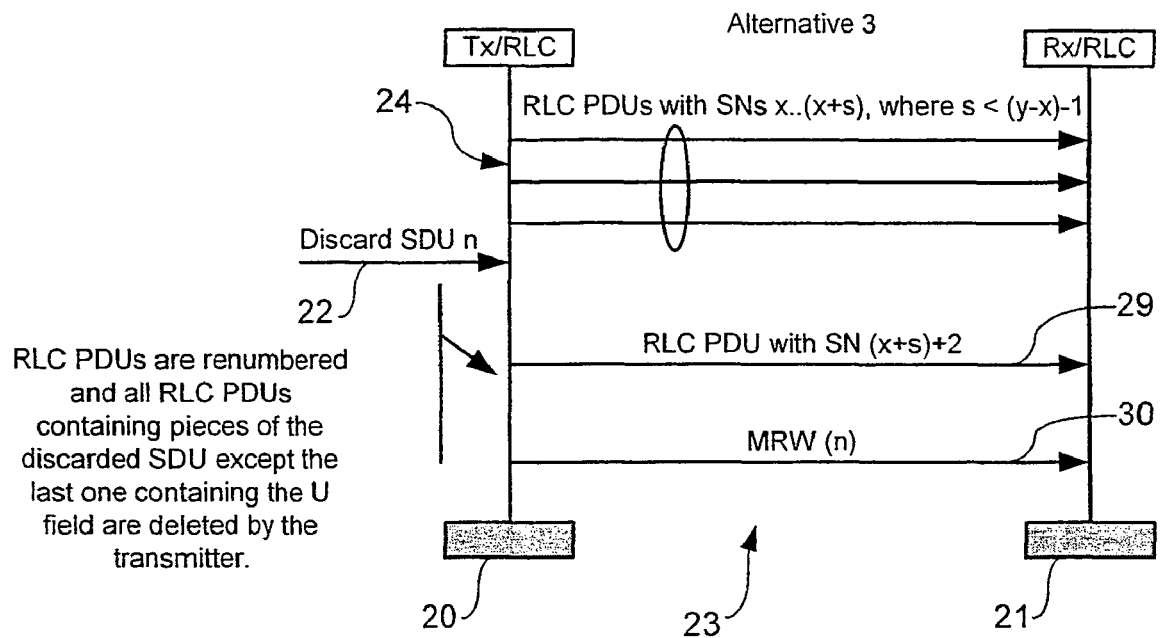

The third method is illustrated in FIG. 5.

In the third method, the PDUs making up the discarded SDU are again not transmitted. The sequence numbers previously allotted to those PDUs are allotted to subsequent PDUs. Thus revised sequence numbers are generated for the AMD PDUs in the transmission buffer so as to utilise the sequence numbers of the non-transmitted PDUs. The AMD PDU carrying the LI field indicating the end of the discarded SDU is given the SN of the second non-transmitted AMD PDU. That SN value is given by VT(S)+1; where VT(S) is the current value of the send state variable of the transmitter, which stores the sequence number of the next PDU to be transmitted for the first time. The subsequent AMD PDUs in the transmitter's buffer are renumbered in-sequence starting from this value. Note that due, for instance, to ciphering issues the renumbered AMD PDUs will not have been sent yet.

The MRW SUFI command (30) and the AMD PDU (29) whose the LI field indicates the end of the discarded SDU are sent from the transmitter to the receiver. In FIG. 5 the MRW SUFI command 30 is shown as being sent first, but since the AMD PDU 29 has been given the SN corresponding to the second non-transmitted AMD PDU the MRW SUFI command 30 and the AMD PDU 29 may be sent in either order. This is because if the RLC PDU SN were (x+s)+1 then the receiver RLC would forward this incorrect SDU to the PDCP layer, because no MRW SUFI command regarding this SDU would have been received by then.

Figure 6:
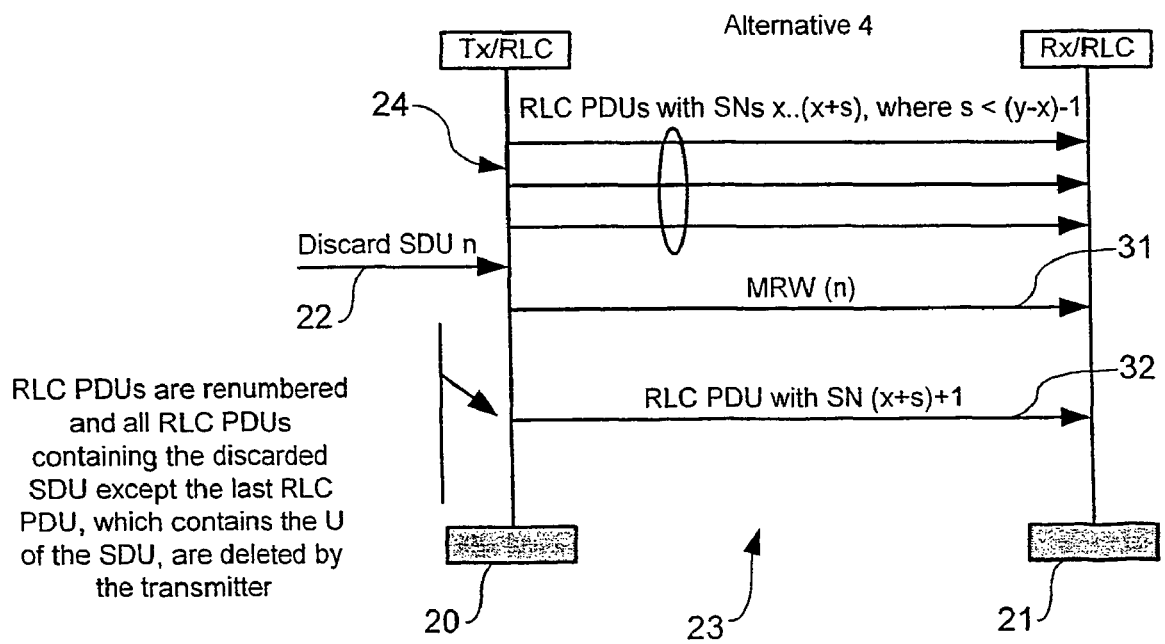

The fourth method is illustrated in FIG. 6.

In the fourth method, the PDUs making up the discarded SDU are again not transmitted. The sequence numbers previously allotted to those PDUs are allotted to subsequent PDUs. Thus revised sequence numbers are generated for the AMD PDUs in the transmission buffer so as to utilise the sequence numbers of the non-transmitted PDUs. The AMD PDU carrying the LI field indicating the end of the discarded SDU is given the SN of the first non-transmitted AMD PDU. That SN is given by the current value of the state variable VT(S). The subsequent AMD PDUs in the transmitter's buffer are renumbered in-sequence starting from this value.

The MRW SUFI command (31) and the AMD PDU (32) whose the LI field indicates the end of the discarded SDU are sent from the transmitter to the receiver. In FIG. 6, since the AMD PDU 32 has been given the SN corresponding to the first non-transmitted AMD PDU the MRW SUFI command 31 must be sent before the AMD PDU 32.

The method of FIG. 6 can not be considered as reliable as that of FIG. 5. In the method of FIG. 6 an error situation may occur if the MRW SUFI command is lost in the radio interface. Then if the following AMD PDU containing the LI field of the discarded SDU is sent before the acknowledgement to the MRW SUFI command has been received, the receiver may consider the SDU to be complete and deliver it to PDCP for subsequent processing. This kind of error could be prevented by blocking the transmission of all new AMD PDUs in the transmission buffer until the MRW SUFI command has been acknowledged. Alternatively it may be convenient to block the transmission of all AMD PDUs (and thus save further radio resources) because, according to the recent RLC specification, executing the SDU discard procedure for a certain SDU causes preceding unacknowledged SDUs to be discarded as well.

In all of these cases the lower edge of the window of acceptable acknowledgements—i.e. the value of the state variable VT(A) at the transmitter, indicating the sequence number of the next in-sequence PDU expected to be acknowledged—is updated only after receiving the acknowledgement to the MRW SUFI command. This is similar to the situation as currently defined in the recent RLC specification. This way the SDU discard procedure and the sending of the MRW SUFI command does not implicitly acknowledge AMD PDUs, which could easily lead to the "run-away" of the sending window and finally to non-synchronized data transmission.

Following the procedures illustrated in FIGS. 3 to 6, and particularly subsequent to the sending of the first MRW SUFI command as shown, the execution of the SDU discard procedure continues as described in the RLC specification.

The procedures set out with reference to FIGS. 3 to 6 offer significant savings in radio resources over prior methods, especially in situations where discard of SDUs is frequent, and even more especially when discard of long SDUs may be executed shortly after the SDUs have started to be transmitted. Such circumstances may arise when there are long transmission delays and/or high numbers of lost AMD PDUs. Furthermore, the approaches described above allow the possibility of improving quality of service, by making SDU delays shorter and lowering the number of lost SDUs; making the protocol less sensitive to errors due to lost or delayed AMD PDUs; and improving the protocol's ability to recover from error situations.

When PDUs of a data message (SDU) have been discarded, the transmission of that data message may be ended by the transmission of a final data unit of the set of data units representing that message. That final data unit can include a length indicator (LI) pointing to the start of the transmitted data of the message, whereby it can be determined at the receiver that transmission of the message has ended.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method, comprising:
    forming a plurality of ordered data units each comprising a part of a data message;
    allotting sequence numbers to each of the ordered data units;
    transmitting at least some of the data units in order;
    identifying a discard status in respect of the data message; and
    when a subset of the ordered data units including the final one of the ordered data units in the order and at least one other of the data units has not been transmitted
        indicating that the data message is to be discarded, and
        re-allotting a sequence number two greater than the sequence number of the last data unit transmitted to the final one of the ordered data units; and transmitting the final one of the ordered data units from the subset, including an indication of the ending of the data message.

2. The method of claim 1, wherein the including the indication of the ending of the data message comprises including an indication specifying the location of the start of the data message.

3. The method of claim 1, wherein on the identifying the discard status in respect of the data message; and when the subset of the data units including the final one of the ordered data units and at least one other of the data units has not been transmitted, the data units of the subset other than the final one of the ordered data units are not transmitted from the transmitter towards the receiver.

4. The method of claim 1, further comprising:
allotting sequence numbers to further data units to be transmitted after the data units comprising part of the data message; and
before transmitting those further data units reallotting consecutive sequence numbers following that reallotted to the final one of the ordered data units to the further data units.

5. The method of claim 1, wherein the indicating that the data message is to be discarded comprises transmitting an indication after transmitting the final one of the ordered data units.

6. The method of claim 1, wherein the transmitting the final one of the ordered data units is performed after transmitting an indication that the data message is to be discarded.

7. The method of claim 1, wherein the transmitting the at least one of the data units comprises transmitting protocol data units.

8. The method of claim 7, wherein the transmitting the protocol data units comprises transmitting radio link control protocol data units.

9. The method of claim 1, wherein the identifying the discard status in respect of the data message comprises identifying the discard status in respect of a status protocol data unit.

10. The method of claim 1, wherein one of the transmitter and the receiver is a mobile station.

11. The method of claim 10, wherein the other of the transmitter and the receiver is a network unit.

12. The method of claim 1, wherein the transmitting the at least some of the data units and the transmitting the final one of the ordered data units from the subset comprise transmitting by a wireless link.

13. The method of claim 12, wherein the transmitting the at least some of the data units and the transmitting the final one of the ordered data units from the subset comprise transmitting by radio.

14. The method of claim 1, wherein the transmitting the final one of the ordered data units in order includes transmitting data specifying the length of the data message.

15. The method of claim 1, wherein the transmitting the at least some of the data units comprises transmitting in an acknowledged mode.

16. The method of claim 1, wherein the transmitting the at least some of the data units comprises transmitting in an unacknowledged mode.

17. A method, comprising:
forming a plurality of ordered data units each comprising a part of a data message;
allotting sequence numbers to each of the ordered data units;
transmitting at least some of the data units in order;
identifying a discard status in respect of the data message; and
when a subset of the ordered data units including the final one of the ordered data units in the order and at least one other of the data units has not been transmitted indicating that the data message is to be discarded,
reallotting a sequence number one greater than the sequence number of the last data unit transmitted to the final one of the ordered data units; and transmitting the final one of the ordered data units from the subset, including an indication of the ending of the data message.

18. An apparatus, comprising:
a processor configured to form a plurality of ordered units each comprising a part of a data message; and
a transmitter configured to transmit at least some of the data units in order and allocate sequence numbers to each of the ordered data units,
wherein the processor is configured to identify a discard status in respect of the data message,
wherein, when a subset of the data units including the final one of the ordered data units in order and at least one other of the data units has not been transmitted
the transmitter is configured to indicate that the data message is to be discarded, and
the transmitter is configured to re-allot a sequence number two greater than the sequence number of the last data unit transmitted to the final one of the ordered data units and to transmit the final one of the ordered data units from the subset, including an indication of the ending of the data message.

19. The apparatus of claim 18, wherein the transmitter is configured to reallot the sequence number by reallotting to the final one of the ordered data units the sequence number one greater than the sequence number of the last data unit transmitted.

20. The apparatus of claim 18, wherein the transmitter is configured to allot sequence numbers to further data units to be transmitted after the data units comprising part of the data message and, before transmitting those further data units, the transmitter is configured to reallot consecutive sequence numbers following that reallotted to the final one of the ordered data units to the further data units.

21. The apparatus of claim 18, wherein the transmitter is configured to transmit the final one of the ordered data units by a wireless link.

22. The apparatus of claim 21, wherein the transmitter is configured to transmit the final one of the ordered data units by radio.

23. The apparatus of claim 18, wherein the transmitter is configured to transmit, with the final one of the ordered data units in order, data specifying the length of the data message.

24. The apparatus of claim 18, wherein the indication of the ending of the data message comprises an indication specifying the location of the start of the data message.

25. The apparatus of claim 18, wherein on the identifying the discard status in respect of the data message; and when the subset of the data units including the final one of the ordered data units and at least one other of the data units has not been transmitted, the transmitter is configured not to transmit the data units of the subset other than the final one of the ordered data units.

26. An apparatus, comprising:
a data transmission controller configured to
form a plurality of ordered data units each comprising a part of a data message,
allot sequence numbers to each of the ordered data units;

cause the transmission of at least some of the data units in order;
identify a discard status in respect of the data message; and
when a subset of the data units including the final one of the ordered data units in order and at least one other of the data units has not been transmitted,
  cause the transmission of an indication that the data message is to be discarded,
  re-allot a sequence number two greater than the sequence number of the last data unit transmitted to the final one of the ordered data units and
  cause the transmission of the final one of the ordered data units from the subset, including an indication of the ending of the data message.

27. An apparatus, comprising:
formation means for forming a plurality of ordered units each comprising a part of a data message;
allotting means for allotting sequence numbers to each of the ordered data units;
transmission means for transmitting at least some of the data units in order; and
identification means for identifying a discard status in respect of the data message,
wherein, when a subset of the data units including the final one of the ordered data units in order and at least one other of the data units has not been transmitted
  the transmission means is configured to indicate that the data message is to be discarded, wherein the apparatus further comprises:
  re-allotting means for re-alloting a sequence number two greater than the sequence number of the last data unit transmitted to the final one of the ordered data units and
  the transmission means is configured to transmit the final one of the ordered data units from the subset, including an indication of the ending of the data message.

28. An apparatus, comprising:
a processor configured to form a plurality of ordered units each comprising a part of a data message; and
a transmitter configured to transmit at least some of the data units in order and allocate sequence numbers to each of the ordered data units,
wherein the processor is configured to identify a discard status in respect of the data message,
wherein, when a subset of the data units including the final one of the ordered data units in order and at least one other of the data units has not been transmitted
  the transmitter is configured to indicate that the data message is to be discarded, and
  the transmitter is configured to re-allot a sequence number one greater than the sequence number of the last data unit transmitted to the final one of the ordered data units and to transmit the final one of the ordered data units from the subset, including an indication of the ending of the data message.

29. An apparatus, comprising:
a data transmission controller configured to
form a plurality of ordered data units each comprising a part of a data message,
allot sequence numbers to each of the ordered data units;
cause the transmission of at least some of the data units in order;
identify a discard status in respect of the data message; and
when a subset of the data units including the final one of the ordered data units in order and at least one other of the data units has not been transmitted,
  cause the transmission of an indication that the data message is to be discarded,
  re-allot a sequence number one greater than the sequence number of the last data unit transmitted to the final one of the ordered data units and
  cause the transmission of the final one of the ordered data units from the subset, including an indication of the ending of the data message.

30. An apparatus, comprising:
formation means for forming a plurality of ordered units each comprising a part of a data message;
allotting means for allotting sequence numbers to each of the ordered data units;
transmission means for transmitting at least some of the data units in order; and
identification means for identifying a discard status in respect of the data message,
wherein, when a subset of the data units including the final one of the ordered data units in order and at least one other of the data units has not been transmitted
  the transmission means is configured to indicate that the data message is to be discarded, wherein the apparatus further comprises:
  re-allotting means for re-alloting a sequence number one greater than the sequence number of the last data unit transmitted to the final one of the ordered data units and
  the transmission means is configured to transmit the final one of the ordered data units from the subset, including an indication of the ending of the data message.

* * * * *